US010411260B2

(12) United States Patent
Felton et al.

(10) Patent No.: US 10,411,260 B2
(45) Date of Patent: Sep. 10, 2019

(54) GRID ELECTRODE FOR POLAR SOLVENT-BASED HYDRO-PYROELECTRODYNAMIC ELECTRICAL ENERGY STORAGE DEVICE

(71) Applicant: Green-on-Green Energy, Inc., Edmonds, WA (US)

(72) Inventors: Samuel P. Felton, Edmonds, WA (US); Peter Agtuca, Edmonds, WA (US); Lin C. Felton, Edmonds, WA (US)

(73) Assignee: GREEN-ON-GREEN ENERGY, INC., Edmonds, WA (US)

( * ) Notice: Subject to any disclaimer, the term of this patent is extended or adjusted under 35 U.S.C. 154(b) by 225 days.

(21) Appl. No.: 15/460,011

(22) Filed: Mar. 15, 2017

(65) Prior Publication Data

US 2017/0294653 A1    Oct. 12, 2017

Related U.S. Application Data

(60) Provisional application No. 62/321,385, filed on Apr. 12, 2016.

(51) Int. Cl.

| | |
|---|---|
| *H01M 4/58* | (2010.01) |
| *H01M 4/60* | (2006.01) |
| *H01G 11/22* | (2013.01) |
| *H01M 4/583* | (2010.01) |
| *B33Y 80/00* | (2015.01) |
| *B33Y 10/00* | (2015.01) |
| *H01G 11/24* | (2013.01) |
| *H01G 11/26* | (2013.01) |
| *H01G 11/30* | (2013.01) |
| *H01G 11/40* | (2013.01) |
| *H01G 11/48* | (2013.01) |
| *H01M 4/02* | (2006.01) |

(52) U.S. Cl.
CPC ............ *H01M 4/583* (2013.01); *B33Y 10/00* (2014.12); *B33Y 80/00* (2014.12); *H01G 11/24* (2013.01); *H01G 11/26* (2013.01); *H01G 11/30* (2013.01); *H01G 11/40* (2013.01); *H01G 11/48* (2013.01); *H01M 2004/021* (2013.01)

(58) Field of Classification Search
CPC .. H01M 4/00; H01M 4/583; H01M 2004/021; H01M 4/602; H01M 4/604; B33Y 10/00; B33Y 80/00; H01G 11/22
See application file for complete search history.

(56) References Cited

U.S. PATENT DOCUMENTS

| | | | | |
|---|---|---|---|---|
| 5,838,015 | A | | 11/1998 | Burdick et al. |
| 6,024,848 | A | | 2/2000 | Dufner et al. |
| 7,736,802 | B1 | * | 6/2010 | Smyth ................ H01M 4/06 |
| | | | | 429/122 |
| 8,278,876 | B2 | | 10/2012 | Bucur et al. |
| 8,883,351 | B2 | | 11/2014 | Todoriki et al. |
| 9,437,897 | B2 | | 9/2016 | Felton |
| 9,768,481 | B2 | | 9/2017 | Pollack |
| 2002/0154469 | A1 | | 10/2002 | Shiue et al. |
| 2005/0255339 | A1 | * | 11/2005 | Tsai ..................... H01M 2/36 |
| | | | | 429/406 |
| 2006/0132102 | A1 | | 6/2006 | Harvey |
| 2007/0096564 | A1 | | 5/2007 | Maeda |
| 2008/0050632 | A1 | | 2/2008 | Salter et al. |
| 2009/0226798 | A1 | | 9/2009 | Pollack |
| 2011/0203631 | A1 | | 8/2011 | Rasco et al. |
| 2012/0067390 | A1 | | 3/2012 | Pollack |
| 2012/0070734 | A1 | * | 3/2012 | Uetani .................. H01M 4/13 |
| | | | | 429/211 |
| 2012/0282530 | A1 | | 11/2012 | Chiang et al. |
| 2012/0293110 | A1 | * | 11/2012 | Frederick .............. H01M 4/46 |
| | | | | 320/101 |
| 2014/0234694 | A1 | * | 8/2014 | Felton .............. H01M 10/0413 |
| | | | | 429/149 |
| 2014/0295265 | A1 | * | 10/2014 | You .................. H01M 10/4235 |
| | | | | 429/211 |
| 2015/0380203 | A1 | * | 12/2015 | Wang .................... H01J 37/08 |
| | | | | 250/288 |
| 2016/0344183 | A1 | | 11/2016 | Felton |
| 2018/0175379 | A1 | * | 6/2018 | Tour ..................... H01L 29/12 |
| 2018/0205113 | A1 | * | 7/2018 | Golodnitsky ......... H01M 10/04 |

OTHER PUBLICATIONS

Chen, C. et al., "Annealing a graphene oxide film to produce a free standing high conductive graphene film," Carbon 2012, 50(2012): 659-667.
Del, S.K. et al., "Optimizing the optical and electrical properties of graphene ink thin films by laser-annealing," 2D Mater. 2(2015) 011003 (6pp).
Ermakov, V.A. et al., "Nonlocal laser annealing to improve thermal contacts between multi-layer graphene and metals," Nanotechnology 24(2013): 155301 (10pp).
Peleg, Roni, "Laser Annealing May Improve Graphene Inks," graphene-info 2015 [retrieved on Mar. 14, 2017] Retrieved from the Internet: http://www.graphene-info.com/laser-annealing-may-improve-graphene-inks.
Chai et al., "Effect of Radiant Energy on Near-Surface Water," J. Phys Chem B 113(42); Oct. 22, 2009; pp. 13953-13958; obtained from http://www.nci.nim.nih.gov/pmc/articles/PMC2843558/, 9 pages.
Chai, et al., "Solute-Free Interfacial Zones in Polar Liquids," J Phys Chem B 114(16); Apr. 29, 2010, pp. 5371-5375; obtained from http://www.ncbi.nlm.nih.gov/pmc/articles/PMC2865192/ , 8 pages.
Chen, et al., "Force field measurements within the exclusion zone of water," J Biol Phys 38(1); Jan. 2012; pp. 113-120; obtained at http://link.springer.com/article/10.1007%2Fs10864-011-9237-5?LI=true , 4 pages.

(Continued)

*Primary Examiner* — Anca Eoff
(74) *Attorney, Agent, or Firm* — Davis Wright Tremaine LLP; Heather M. Colburn

(57) ABSTRACT

An electrode having a planar electrode body with a plurality of hexagonally shaped through-holes formed therein. The planar electrode body is configured for use in a polar, protic, or aprotic solvent of a Hydro-Pyroelectrodynamic ("H-PED") energy storage device. The electrode may be constructed using a method that includes applying a layer of graphene to an outer surface of the planar electrode body, and annealing the outer surface of the planar electrode body after the layer of graphene has been applied thereto.

38 Claims, 5 Drawing Sheets

(56) References Cited

OTHER PUBLICATIONS

Ovchinnikova, et al., "Can Water Store Charge?" Langmuir, 25(1); 2009; published online on Nov. 24, 2008; pp. 542-547.

Zheng, et al., "Long-range forces extending from polymer-gel surfaces," white paper published by University of Washington Department of Bioengineering and in Phys Rev E 68; 2003; pp. 1-14.

Zheng, et al., "Surfaces and interfacial water: Evidence that hydrophilic surfaces have long-range impact," Advances in Colloid and Interface Science 127, Sep. 6, 2006, pp. 19-27.

International Search Report and Written Opinion of the International Search Authority for International Application No. PCT/US14/16553, dated May 19, 2014.

LTC3109 (Auto-Polarity, Ultralow Voltage Step-Up Converter and Power Manager, Datasheet, Linear Technology, 2010).

Non-Final Office Action, dated Aug. 14, 2018, received in U.S. Appl. No. 15/230,052.

Information Disclosure Statement Transmittal submitted herewith.

Notice of Allowance, dated Feb. 21, 2019, received in U.S. Appl. No. 15/230,052.

Bhaumik, A. et al., "Wafer scale integration of reduced graphene oxide by novel laser processing at room temperature in air," J. Appl. Phys. 120, 105304 (2016), 14 pages.

Chen, K. et al., "Fabrication of graphene by pulsed laser annealing from a graphene oxide thin film," CLEO Technical Digest (Optical Society of America, 2012), paper JW4A.121, 2 pages.

\* cited by examiner

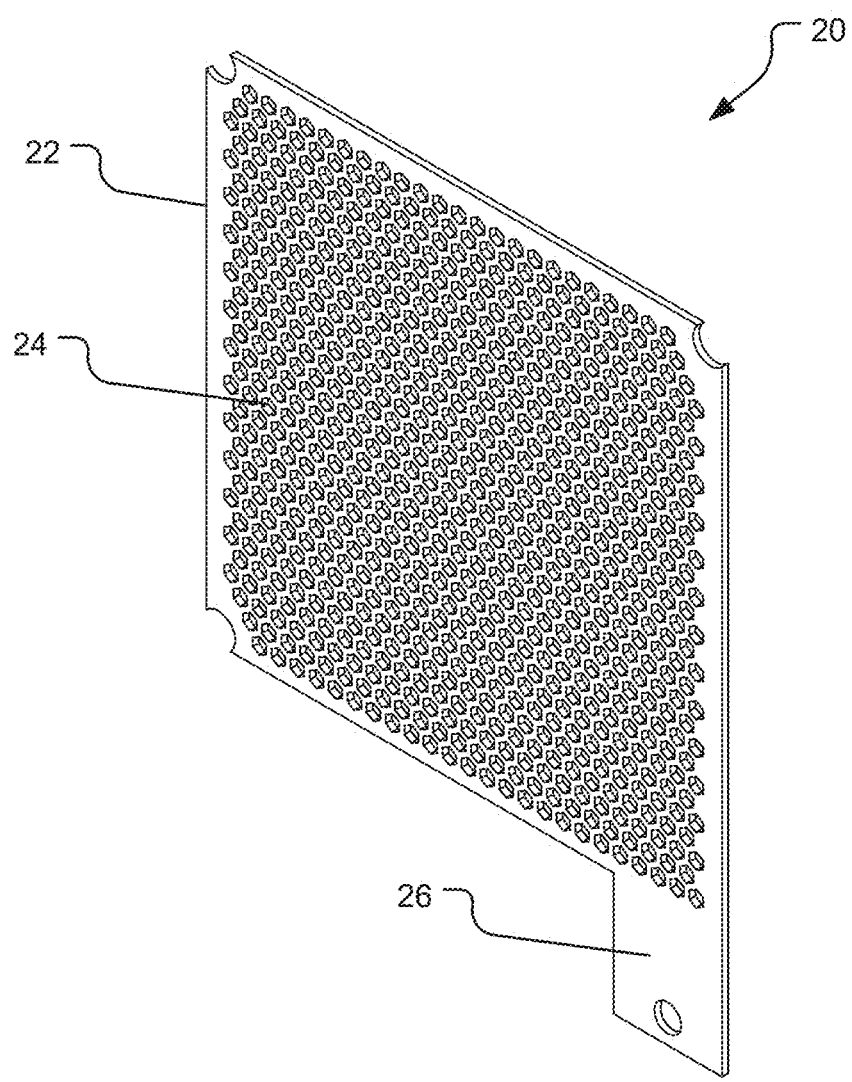
Fig. 2: Perspective View of Printed Electrode

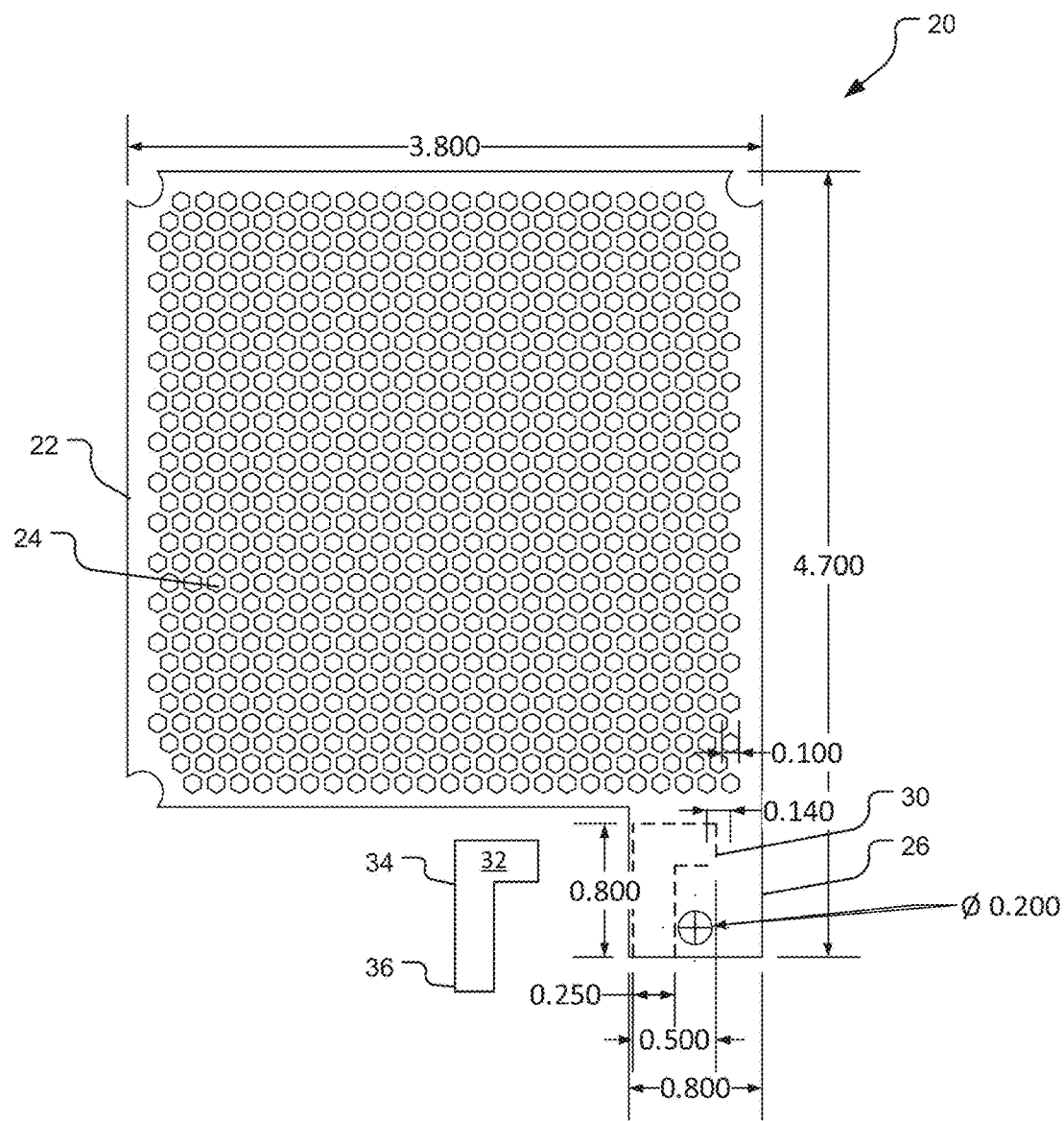
Fig. 3: Front View of Printed Electrode

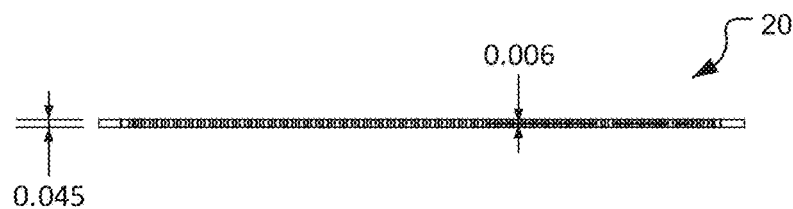
Figure 4: Side View of Printed Electrode, with Example Dimensions
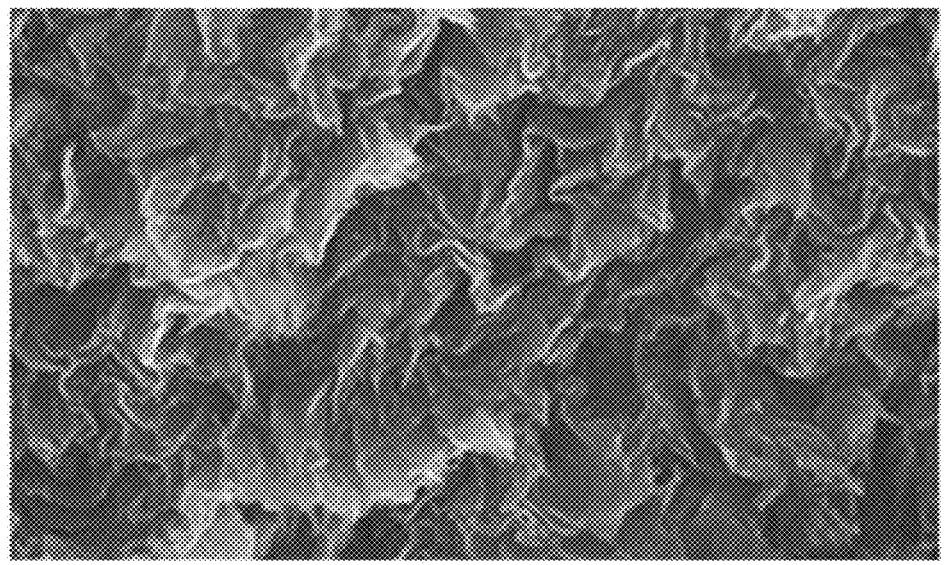
Figure 5: Involuted graphene sheets/platelets
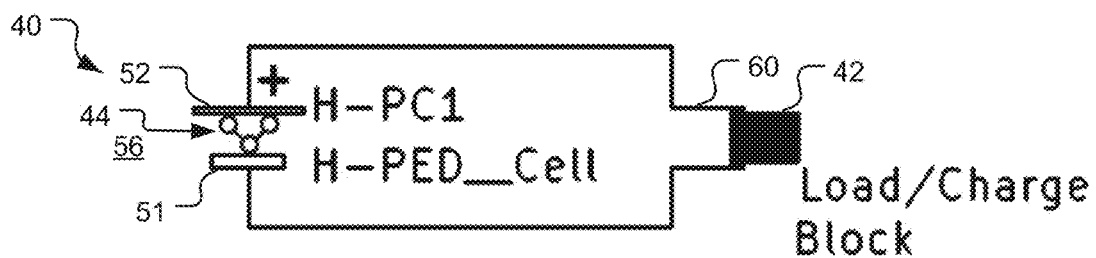
Figure 6

GRID ELECTRODE FOR POLAR SOLVENT-BASED HYDRO-PYROELECTRODYNAMIC ELECTRICAL ENERGY STORAGE DEVICE

CROSS REFERENCE TO RELATED APPLICATION(S)

This application claims the benefit of U.S. Provisional Application No. 62/321,385, filed on Apr. 12, 2016, which is incorporated herein by reference in its entirety.

BACKGROUND OF THE INVENTION

Field of the Invention

The present invention is in the field of electrical and electronic devices; more particularly, the technical field of electrical energy storage and capture devices.

Description of the Related Art

Conventional electrical energy storage devices such as electrolytic batteries and capacitors utilize ionic-exchange chemical reactions or dielectric behavior to store charge, which induces electro-motive force ("EMF") in metallic electrodes, forcing an electrical current through connected loads. All current energy storage devices use one of these two methods—ionic-exchange or dielectric charge-storage—and have done so for over one hundred years.

A new class of energy storage device has been developed very recently, utilizing a completely unrelated physical phenomenon that has come to be known as a Hydro-Pyroelectrodynamic ("H-PED") energy storage device. These devices are based on a late-twentieth-century scientific discovery (recently expanded in the twenty-first), namely, that polar solvents such as Water ($H_2O$) and Ethylene Glycol ($C_2H_6O_2$) naturally self-organize to form liquid-crystal structures when in contact with hydrophilic compounds. Said structures are, strictly by means of their polar nature and without the use of electrolytes, capable of storing and releasing electrical energy well in excess of and with far less energy loss than capacitor devices and without the toxic and complex chemical compositions of ionic-exchange battery devices. Electrical current may be drawn from the device by attracting the mass of charge-carrying particles at either edge of the structure through an electrode and thereafter out of the device and into an electronic load.

By their nature, that is to say, operating without a reversible chemical ion-exchange reaction, H-PED storage devices have both a fast reaction time (charge/discharge) and a very long lifespan (many millions of charge/discharge cycles without degradation). However, said nature also requires a different type of electrode—an electrode which is simultaneously highly conductive and chemically non-reactive when at operation temperatures and in contact with the polar solvent. The construction of the electrode is critical for a properly-performing H-PED device.

Therefore, needs exist for new electrode designs and methods of producing electrodes. The present application provides these and other advantages as will be apparent from the following detailed description and accompanying figures.

BRIEF DESCRIPTION OF THE SEVERAL VIEWS OF THE DRAWING(S)

FIG. 2 is a perspective view of an electrode for use in an H-PED energy storage device like the one illustrated in FIG. 1.

FIG. 3 is a front view of the electrode of FIG. 2.

FIG. 4 is a side view of the electrode of FIG. 2.

FIG. 5 is a magnified view of an aliphatic hydrocarbon-based polymer filament infused with one or more planar-deformed graphene sheets or sheet-like plates, showing involutions of the graphene surfaces.

FIG. 6 is a schematic view of the electrode of FIG. 2. used in an exemplary H-PED device attached to an electrical load and/or a charging circuit.

Like reference numerals have been used in the figures to identify like structures.

DETAILED DESCRIPTION OF THE INVENTION

Figure 1:
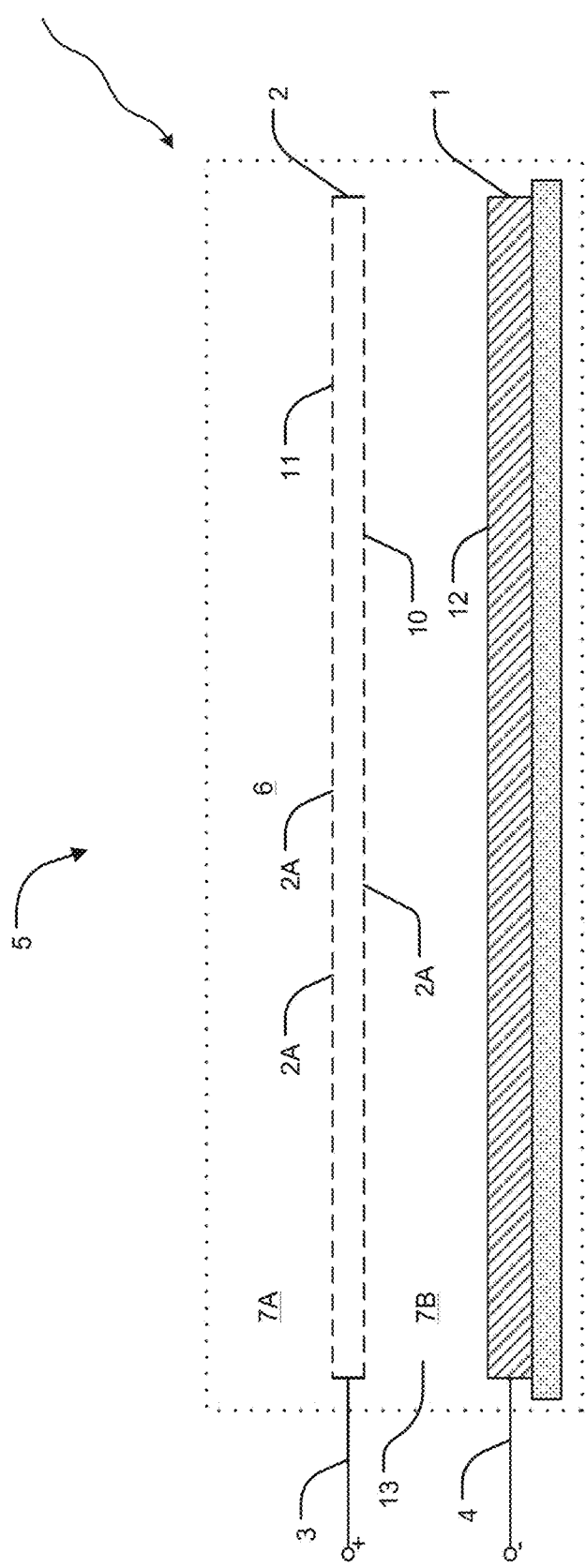
FIG. 1 is a lateral cross-sectional view of a single cell of an exemplary H-PED energy storage device.

FIG. 1 is reproduced from U.S. patent application Ser. No. 13/771,970, which is incorporated herein by reference in its entirety. U.S. patent application Ser. No. 13/771,970 describes an electrical energy storage cell 5 that utilizes electrical polarization of either side of a "hydrophilic exclusion zone," "HEZ," and its concomitant EMF, to extract charge and thus power electrical devices and circuitry. The cell 5 is provided as an example of an H-PED energy storage device.

The cell 5 includes a cathode electrode 1, an anode electrode 2, and a polar solution 6. The cathode electrode 1 has an upper hydrophilic surface 12 and may be constructed from any hydrophilic and highly-electrically-conductive material. The anode electrode 2 has a first surface 10 opposite a second surface 11. The cathode electrode 1 and the anode electrode 2 are submerged in a solution 6 (e.g., protic or aprotic polar liquids, such as water, alcohol, formic acid, dimethylsulfoxide ("DMSO"), ethanol, methanol, propylene carbonate, a combination thereof, and the like). A gap 13 is defined between the upper hydrophilic surface 12 of the cathode electrode 1 and the first surface 10 of the anode electrode 2. The anode electrode 2 is configured to move and/or flex in at least one dimension. This moving and/or flexing allows a distance between the first surface 10 of the anode electrode 2 and the upper hydrophilic surface 12 of the cathode electrode 1 to change to thereby change the size of the gap 13.

Contact with the upper hydrophilic surface 12 of the cathode electrode 1 causes a second portion 7B of the solution 6 in the gap 13 to change state and self-order, forming an exclusion-zone ("EZ"). On the other hand, a first portion 7A of the solution 6 is generally unordered and in a higher entropic state than that of the ordered second portion 7B. As the structure forming the EZ self-assembles in the gap 13, the molecules in the second portion 7B of the solution 6 form a tightly-packed crystalline lattice. Solutes, precipitates, and other suspended solids are forcibly excluded from the second portion 7B of the solution 6, including the material composing the anode electrode 2 structure. This exclusion of the anode electrode 2 causes the anode electrode 2 to be forced out of the gap 13, placing the anode electrode 2 within but at the immediate near-edge of the unordered first portion 7A of higher $H^+$ potential, thus providing a positive charge relative to the exclusion-zone itself.

When the volume of the ordered second portion 7B expands with respect to the volume of the unordered first portion 7A, the charge differential formed in proximity of ordered second portion 7B and unordered first portion 7A of the solution 6 creates an electrical potential between a positive lead 3 and a negative lead 4. Thus, the cell 5 functions without current flowing between the cathode and anode electrodes 1 and 2 through the solution 6. Therefore, the solution 6 is free of charge carriers (e.g., ions) and is not an ionically conductive medium.

FIG. 2 depicts an example of a porous, hexagonal-grid, planar electrode 20 that may be used to implement the cathode electrode 1 and/or the anode electrode 2 illustrated in FIG. 1. By way of non-limiting examples, the electrode 20 may be constructed from the following materials:

1. An aliphatic hydrocarbon-based polymer filament, such as Polylactic Acid (PLA, formula $(C_3H_4O_2)_n$), Polylactic Acid-b-Polyethylene Glycol (PLA-b-PEG), or the like. The polymer used to construct the filament may be a hydrophilic polymer. The filament may be formed through an extrusion process. The filament may have a maximum diameter of about 1.75 mm and a recommended extrusion temperature of about 220° C. or less.
2. An aliphatic hydrocarbon-based polymer filament (first material listed above) infused with one or more planar-deformed graphene sheets and sheet-like plates illustrated in FIG. 5. The infusion process ensures that the graphene is deformed, creating peaks and valleys in the material. Said material shall, once formed, exhibit volume resistivity of about 0.6 Ω-cm or less. By way of a non-limiting example, a graphene infused filament suitable for constructing the electrode 20 may be purchased from BlackMagic3D of Calverton, N.Y. (which operates a website at www.BlackMagic3D.com) as conductive graphene filament.

The first material and/or the second material listed above may be supplied as either a continuous filament on a roll or spool, or in pellet-form, for use in an extrusion-type fabricator (e.g., a 3D Printer, injection-molding machine, or the like). Optionally, a connector structure (not shown) may be used to attach an electrical conductor 32 (see FIG. 3), such as the positive lead 3 or the negative lead 4 (e.g., implemented as a wire, a graphene structure, a doped semiconductor, and the like) to the electrode 20, within which said conductor 32 may be held in place via compression.

The electrode 20 may be generally planar and have a generally rectangular structure 22 (e.g., of extruded material). The rectangular structure 22 may be characterized as being a planar electrode body. A central portion of the rectangular structure 22 may include a latticework of regular hexagons 24, and a tab 26 may formed along a periphery of the rectangular structure 22 and/or extend outwardly therefrom. The electrical conductor 32 (e.g., the positive lead 3 or the negative lead 4) may be connected to the tab 26, which may provide support for the electrical conductor 32. A cavity or recess 30 (identified by dashed lines) may be formed in the tab 26. A portion 34 of the electrical conductor 32 is sized appropriately to occupy the recess 30. However, a portion 36 may extend outwardly beyond the electrode 20 and be connected to one or more external structures (e.g., a wire, a lead, and the like). At least a portion of the tab 26 is deposited around the conductor 32 (e.g., during 3D printing or injection-mold fabrication), capturing the portion 34 of the conductor 32 in place and maintaining, through compression of the tab 26 around the portion 34 of the electrical conductor 32, good electrical contact while simultaneously holding the electrical conductor 32 in place physically. Said compression maintains the portion 34 of the electrical conductor 32 inside the recess 30 and helps keep the portion 34 of the electrical conductor 32 separated from the solution 6. Additional structures may not be required to provide a good electrical contact between the electrode 20 and the electrical conductor 32.

The electrode 20 may be constructed using a three-dimensional ("3D") printing process. For example, a 3D printer may receive an aliphatic hydrocarbon-based polymer filament and print it to form the rectangular structure 22 with the latticework of regular hexagons 24. In such embodiments, the latticework of regular hexagons 24 may provide a grid-like pattern of pores or through-holes. The hexagons 24 may be filled with involuted graphene sheets and platelets when the second material listed above is used. Alternatively, the electrode 20 may be constructed using injection-molding.

FIG. 6 is schematic of an exemplary H-PED device 40 (e.g., the cell 5) connected to an exemplary load 42. The H-PED device 40 is configured to provide electricity (stored in an exclusion zone 44) to the load 42. In embodiments in which the H-PED device 40 is an energy storage system (e.g., a battery), instead of the load 42, the H-PED device 40 may be connected to a charging circuit (not shown). In such embodiment, the H-PED device 40 may receive electricity from the charging circuit (not shown), the energy received is stored in the exclusion zone 44.

The H-PED device 40 includes cathode and anode electrodes 51 and 52 substantially identical to the cathode and anode electrodes 1 and 2 (see FIG. 1). Additionally, the cathode and anode electrodes 51 and 52 are submerged in a solution 56 substantially identical to the solution 6 (see FIG. 1). Further, the exclusion zone 44 forms between the cathode and anode electrodes 51 and 52 that is substantially identical to the exclusion zone that forms between the cathode and anode electrodes 1 and 2 (see FIG. 1). In this embodiment, the electrode 20 (see FIGS. 2-4) is used to implement the anode electrode 52. The electrode 20 may provide advantages to the H-PED device 40 that include, without limitation, enhanced conductivity of charge carriers from an edge of the exclusion zone 44 of the H-PED device 40 to one leg 60 of the load 42 and/or a charging circuit (not shown). Additionally, the electrode 20 is non-reactive with the solution 56 (e.g., an aprotic or protic polar solvent), which makes up the liquid phase of the H-PED device 40. Thus, the H-PED device 40 functions without current flowing between the cathode and anode electrodes 51 and 52 through the solution 56. Therefore, the solution 56 is free of charge carriers (e.g., ions) and is not an ionically conductive medium.

Referring to FIG. 2, in implementations in which the electrode 20 is constructed from planar-deformed graphene sheets and sheet-like plates infused within the aliphatic hydrocarbon-based polymer filament (the second material listed above), the electrode 20 may have a long lifespan. The structure of the electrode 20 can be maintained (ensuring a long lifespan in the electrode 20) because the aliphatic hydrocarbon filament (within which the graphene sheets are embedded) and the graphene sheets themselves are both non-reactive with the solution 56 (see FIG. 6), which may be implemented as an aprotic or protic polar solvent. Also, the aliphatic hydrocarbon material used in the filament is made more rigid by the infusion of graphene sheets.

Similarly, when the filament includes a hydrophilic polymer and both the graphene sheet fragment and platelet structures infused within the aliphatic hydrocarbon filament (and subsequently the electrode 20 which is extruded therefrom) are involuted (folded and wrinkled) as shown in FIG. 5, the focus and concentration of charge carriers within the electrode 20 enhance its ability to draw electrical charge from the exclusion zone 44 (see FIG. 6) in the H-PED device 40 (see FIG. 6), making it more efficient and increasing the storage capacity.

Figure 7:
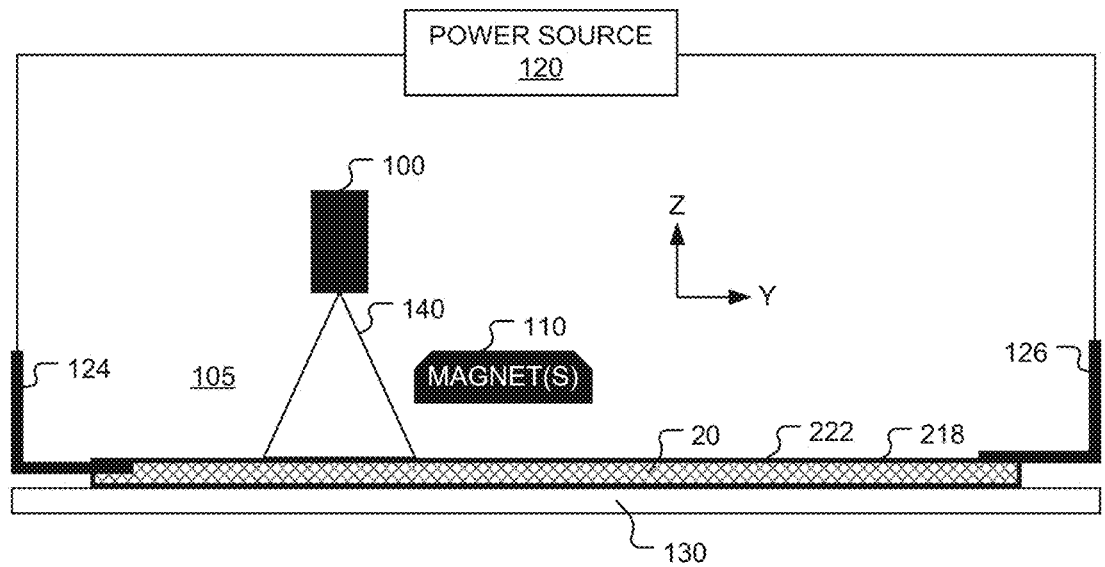
FIG. 7 is an illustration of a process being applied to the electrode of FIG. 2.
Figure 8:
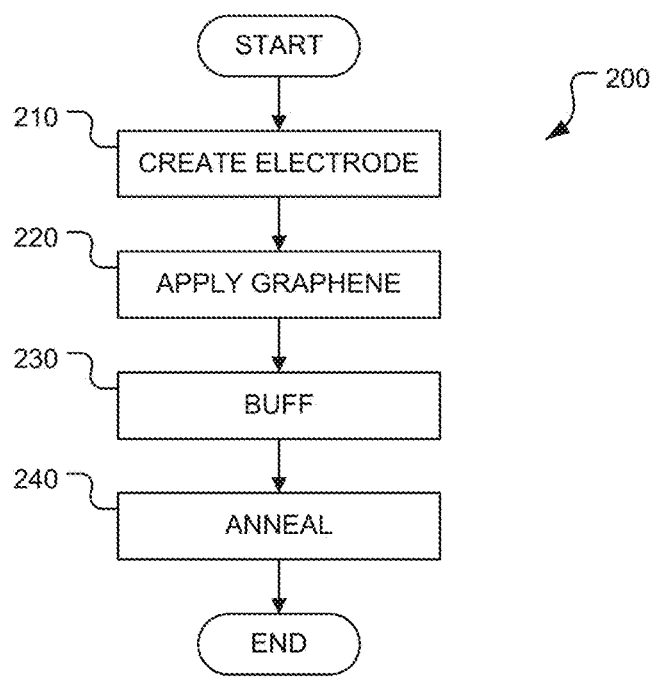
FIG. 8 is a flow diagram of the process of FIG. 7.

Referring to FIGS. 7 and 8, in embodiments in which the electrode 20 is constructed using a 3D printing process, the electrode 20 may undergo a process 200 post-printing. In first block 210, the electrode 20 is created (e.g., 3D printed). Then, in block 220, additional graphene is applied to one or more of the outside surfaces 218 of the electrode 20 to form an outer graphene layer 222 (see FIG. 7). For example, referring to FIG. 7, the outer graphene layer 222 may be applied to the entire outer surface of the electrode 20. The outer graphene layer 222 may be applied by exposing the surfaces of the electrode 20 to particulate graphene material (e.g., graphene platelets). Then, in block 230 (see FIG. 8), the outer graphene layer 222 may be buffed, which causes the graphene sheets to align in the vertical plane (or along the Z-direction) and adhere to the surfaces of the 3D-printed material of the electrode 20.

In last block 240 (see FIG. 8), the outer graphene layer 222 is annealed to form a single-layer, activated, conductive, graphene-sheeted surface over one or more surfaces of the electrode 20. For example, the entire exposed body of the electrode 20 may be annealed. FIG. 7 illustrates an example annealing process that uses an industrial laser 100, oxygenated atmosphere 105, one or more high-gauss rare-earth (or permanent) magnets 110, and a direct-electric current (or pulsed-direct-electric current) received from a power source 120 and passed through the electrode 20 (via contacts or conductors 124 and 126). The magnet(s) 110 create a magnet field having a fixed field-strength. By way of a non-limiting example, the magnet(s) 110 may be implemented as N50 and N45 neodymium industrial magnets with the N50 magnet having a field-strength of about ½ Tesla and the N45 magnet having a field-strength of around ⅓ Tesla. The industrial laser 100 may be used to anneal the outer graphene layer 222 in the magnetic field created by the magnet(s) 110. This links individual sheets of the outer graphene layer 222 into a single surface layer graphene sheet, while simultaneously oxidizing the outer surface of that graphene sheet, causing it to be highly conductive when immersed in the polar aprotic or protic solvent (e.g., the solution 56) as described. Thus, the process 200 (see FIG. 8), creates a conductive and incorruptible surface on the electrode 20 by aligning and sealing the outer graphene layer 222.

One of the conductors 124 and 126 may be implemented as the electrical conductor 32 (see FIG. 3) and the other conductor may be removed after the process 200 (see FIG. 8) is completed. The conductor 124 may be embedded in the electrode 20 and the conductor 126 may be applied to the electrode 20 (e.g., using pressure). The conductor 124 may be embedded or cast in the electrode 20 (e.g., during the 3D printing process). The conductors 124 and 126 may be constructed from copper. However, this is not a requirement.

Referring to FIG. 8, initially, after 3D printing (block 210), measured five-point impedance of the electrode 20 is about 150 Ohms ("Ω"). However, as the graphene platelets align (along the Z-direction illustrated in FIG. 7) during buffing (block 230) and annealing (block 240), the measured five-point impedance decreases by an order of magnitude (e.g., to about 10Ω). However, depending upon the implementation details, the measured five-point impedance may be decreased to about 1.2Ω. As mentioned above, the power source 120 is configured to deliver direct current ("DC"), which may optionally be pulsed, to the electrode 20. Because the impedance of the electrode 20 decreases during blocks 230 and 240 of the process 200, the electric current applied to the electrode 20 increases. For example, during the anneal (block 240), the electric current may increase exponentially from an initial current of around 80 milliampere ("mA") to a maximum current of about 1.2 amperes ("A") to about 1.3 A. However, depending upon the implementation details, the maximum current may be about 7 A to about 10 A. The electric current may have a voltage between 12 Volts DC and 14 Volts DC.

The electrode 20 may be positioned upon a non-conductive platform 130 during the annealing process. The platform 130 may or may not move. By way of a non-limiting example, the platform 130 may move in both X and Y directions. The head of the industrial laser 100 and the magnet(s) 110 may or may not be movable, either independently or simultaneously. As shown in FIG. 7, laser light leaving the industrial laser 100 may have a dispersal pattern 140.

Depending upon the implementation details, the electrode 20 may be characterized as being a non-ionically-corruptible, highly-charge-motile, involuted graphene-sheet-infused, hexagonally-3D-printed, post-printing-laser-treated, planar electrode (e.g., for use as the anode electrode 52 of the H-PED device 40 illustrated in FIG. 6). By way of another non-limiting example, the electrode 20 may be used to implement the anode electrode 2 (see FIG. 1) of the cell 5 (see FIG. 1).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A Hydro-Pyroelectrodynamic ("H-PED") energy storage device comprising:
   a solvent free of charge carriers; and
   first and second electrodes positioned in the solvent, the first electrode having a plurality of hexagonally shaped through-holes formed therein, the first electrode comprising a planar electrode body constructed from Polylactic Acid infused with planar-deformed graphene sheets or Polylactic Acid-b-Polyethylene Glycol infused with planar-deformed graphene sheets.

2. The H-PED energy storage device of claim 1, wherein an outer layer of graphene covers at least a portion of the first electrode.

3. The H-PED energy storage device of claim 2, wherein the outer layer of graphene is formed by applying graphene platelets to the portion of the first electrode and annealing the graphene platelets to form the outer layer of graphene.

4. The H-PED energy storage device of claim 1, wherein the planar electrode body is constructed using three-dimensional printing.

5. The H-PED energy storage device of claim 4, wherein an outer layer of graphene covers at least a portion of the planar electrode body, the outer layer of graphene having been annealed by a laser after being applied to the portion of the planar electrode body.

6. The H-PED energy storage device of claim 5, wherein the annealing occurs in a magnet field.

7. The H-PED energy storage device of claim 6, wherein an electric current is applied to the planar electrode body during the annealing.

8. The H-PED energy storage device of claim 1, wherein a conductor is embedded in the planar electrode body.

9. The H-PED energy storage device of claim 1, wherein the solvent is a polar, protic, or aprotic solvent.

10. A method of constructing an electrode, the method comprising:
    constructing a planar electrode body with a latticework of hexagons formed therein;
    applying a layer of graphene to an outer surface of the planar electrode body;
    annealing the outer surface of the planar electrode body after the layer of graphene has been applied thereto; and
    applying a magnet field generated by one or more magnets to the planar electrode body during annealing.

11. The method of claim 10, wherein the electrode is configured for use in a polar, protic, or aprotic solvent of a Hydro-Pyroelectrodynamic ("H-PED") energy storage device.

12. The method of claim 10, wherein the planar electrode body is constructed using three-dimensional printing.

13. The method of claim 10, wherein the outer surface of the planar electrode body is annealed by an industrial laser.

14. The method of claim 10, further comprising:
    applying an electric current to the planar electrode body during annealing.

15. The method of claim 10, further comprising:
    embedding a conductor in the planar electrode body during the construction of the planar electrode body.

16. The method of claim 10, further comprising:
    buffing the layer of graphene before annealing the outer surface of the planar electrode body.

17. The method of claim 10, wherein the planar electrode body is constructed from Polylactic Acid infused with planar-deformed graphene sheets or Polylactic Acid-b-Polyethylene Glycol infused with planar-deformed graphene sheets.

18. A method of constructing an electrode, the method comprising:
    constructing a planar electrode body with a latticework of hexagons formed therein;
    applying a layer of graphene to an outer surface of the planar electrode body; and
    annealing the outer surface of the planar electrode body after the layer of graphene has been applied thereto, the annealing occurring within a magnet field having a fixed strength.

19. The method of claim 18, wherein the electrode is configured for use in a polar, protic, or aprotic solvent of a Hydro-Pyroelectrodynamic ("H-PED") energy storage device.

20. The method of claim 18, wherein the planar electrode body is constructed using three-dimensional printing.

21. The method of claim 18, wherein the outer surface of the planar electrode body is annealed by an industrial laser.

22. The method of claim 18, further comprising:
    applying an electric current to the planar electrode body during annealing.

23. The method of claim 18, further comprising:
    embedding a conductor in the planar electrode body during the construction of the planar electrode body.

24. The method of claim 18, further comprising:
    buffing the layer of graphene before annealing the outer surface of the planar electrode body.

25. The method of claim 18, wherein the planar electrode body is constructed from Polylactic Acid infused with planar-deformed graphene sheets or Polylactic Acid-b-Polyethylene Glycol infused with planar-deformed graphene sheets.

26. A method of constructing an electrode, the method comprising:
    constructing a planar electrode body with a latticework of hexagons formed therein;

applying a layer of graphene to an outer surface of the planar electrode body;
annealing the outer surface of the planar electrode body after the layer of graphene has been applied thereto; and
applying an electric current to the planar electrode body during annealing.

27. The method of claim 26, wherein the electrode is configured for use in a polar, protic, or aprotic solvent of a Hydro-Pyroelectrodynamic ("H-PED") energy storage device.

28. The method of claim 26, wherein the planar electrode body is constructed using three-dimensional printing.

29. The method of claim 26, wherein the outer surface of the planar electrode body is annealed by an industrial laser.

30. The method of claim 26, further comprising:
embedding a conductor in the planar electrode body during the construction of the planar electrode body.

31. The method of claim 26, further comprising:
buffing the layer of graphene before annealing the outer surface of the planar electrode body.

32. The method of claim 26, wherein the planar electrode body is constructed from Polylactic Acid infused with planar-deformed graphene sheets or Polylactic Acid-b-Polyethylene Glycol infused with planar-deformed graphene sheets.

33. A method of constructing an electrode, the method comprising:
constructing a planar electrode body with a latticework of hexagons formed therein;
applying a layer of graphene to an outer surface of the planar electrode body;
buffing the layer of graphene before annealing the outer surface of the planar electrode body; and
annealing the outer surface of the planar electrode body after buffing the layer of graphene.

34. The method of claim 33, wherein the electrode is configured for use in a polar, protic, or aprotic solvent of a Hydro-Pyroelectrodynamic ("H-PED") energy storage device.

35. The method of claim 33, wherein the planar electrode body is constructed using three-dimensional printing.

36. The method of claim 33, wherein the outer surface of the planar electrode body is annealed by an industrial laser.

37. The method of claim 33, further comprising:
embedding a conductor in the planar electrode body during the construction of the planar electrode body.

38. The method of claim 33, wherein the planar electrode body is constructed from Polylactic Acid infused with planar-deformed graphene sheets or Polylactic Acid-b-Polyethylene Glycol infused with planar-deformed graphene sheets.

* * * * *